United States Patent [19]

Takeda et al.

[11] 4,284,295
[45] Aug. 18, 1981

[54] WEBBING HANGING DEVICE

[75] Inventors: Nobuhiro Takeda; Masaichi Hattori; Shigeo Mizuno, all of Aichi, Japan

[73] Assignees: Toyota Jidosha Kogyo Kabushiki Kaisha, Toyota; Kabushiki Kaisha Tokai-Rika-Denki Seisakusho, Nishikasugai, both of Japan

[21] Appl. No.: 86,423

[22] Filed: Oct. 19, 1979

[30] Foreign Application Priority Data

Nov. 9, 1978 [JP] Japan .......................... 53/154867[U]

[51] Int. Cl.³ .......................................... B60R 21/10
[52] U.S. Cl. ................... 280/803; 180/268; 280/808; 297/481
[58] Field of Search ............... 280/801, 802, 803, 807, 280/808; 180/82 C; 297/468, 481, 483

[56] References Cited

U.S. PATENT DOCUMENTS 3,831,702  8/1974  Kaneko ................................ 280/803
3,857,581  12/1974  Kaneko ................................ 280/802

Primary Examiner—Joseph F. Peters, Jr.
Assistant Examiner—John A. Carroll
Attorney, Agent, or Firm—Koda and Androlia

[57] ABSTRACT

A webbing hanging hook is projected into a cabin from a vehicle door, said hook is biased in the direction of a webbing hanging position, and, after an occupant is seated, a driving force of a motor is transmitted to said hook to rotate same in the direction of a webbing dropping position, whereby webbings can be automatically fastened to the occupant. After the webbings are dropped, a clutch prevents the driving force of the motor from being transmitted, whereby said hook is returned to the webbing hanging position by a biasing force of a resilient member.

10 Claims, 8 Drawing Figures

WEBBING HANGING DEVICE

BACKGROUND OF THE INVENTION

1. Field of the Invention

This invention relates to a webbing hanging device on which is temporarily hung the intermediate portion of webbings for restraining an occupant.

2. Description of the Prior Art

A webbing hanging device is of such an arrangement that an occupant of a vehicle hangs webbings on a hanging hook provided on a holder when leaving the vehicle. When the occupant closes the door upon entering the vehicle again, said hanging hook is rotated to drop the intermediate portion of the webbings, whereby the occupant restraining webbing whose opposite ends are engaged with the center of the vehicle and the door, respectively, is surroundingly attached at the intermediate portions thereof to the occupant, so that the webbings can be automatically fastened to the occupant.

The hanging device which has been proposed is constructed such that a holder of said hanging device is rotated to a webbing dropping positon by tension of webbings, i.e. a wind-up biasing force of a retractor provided between one end of the webbing and the vehicle, and said holder is restored to a webbing hanging position by a return spring after the webbing is dropped. However, tension of the webbings is designed to be very weak in order to reduce the uncomfortable oppressive feeling given to an occupant, and in most cases, the tension of the webbings cannot rotate the hanging hook to a dropping position against a force of the return spring for hanging. From this reason, the force of the return spring for hanging. From this reason, the force of the return spring for hanging must be designed to be considerably weak. By such weak force of the return spring, it is difficult to restore the hanging hook to a hanging position after the webbings are dropped. Additionally, a solenoid has been used for holding the hanging hook at the hanging position, whereby no strong force can be obtained, and moreover, the device is required to be large in size.

Furthermore, in the vehicle provided therein with said hanging device, there has been such a possibility that the occupant, while holding the webbings hung on the hanging hook, closes the door when entering the vehicle, in which operation a strong force for closing the door acts on the hanging hook, so that said hook may be broken.

SUMMARY OF THE INVENTION

The present invention contenplates to obviate the above-described disadvantages, and therefore, one object of the present invention is to provide a webbing hanging device wherein a webbing hanging hook can be reliably rotated from a hanging position to a dropping positon, the hanging hook can be reliably restored to the hanging position after the webbings are dropped, and moreover, said webbing hanging device is prevented from being broken even in the case the occupant, while holding the webbings, closes the door when entering the vehicle.

In the webbing hanging device according to the present invention, a holder provided thereon with a hanging hook is biased by a resilient member in the direction of the hanging position, a driving source such as a motor for rotating the holder in the direction of dropping the webbings is provided, and a driving force of said driving source is imparted to the holder through a clutch only where deemed necessary, i.e. when the occupant enters the vehicle, whereby the holder is rotated in the direction of dropping the webbing against the biasing force of the resilient member.

Description will hereunder be given of one embodiment of the present invention with reference to the drawings.

DESCRIPTION OF THE PREFERRED EMBODIMENT

Figure 1:
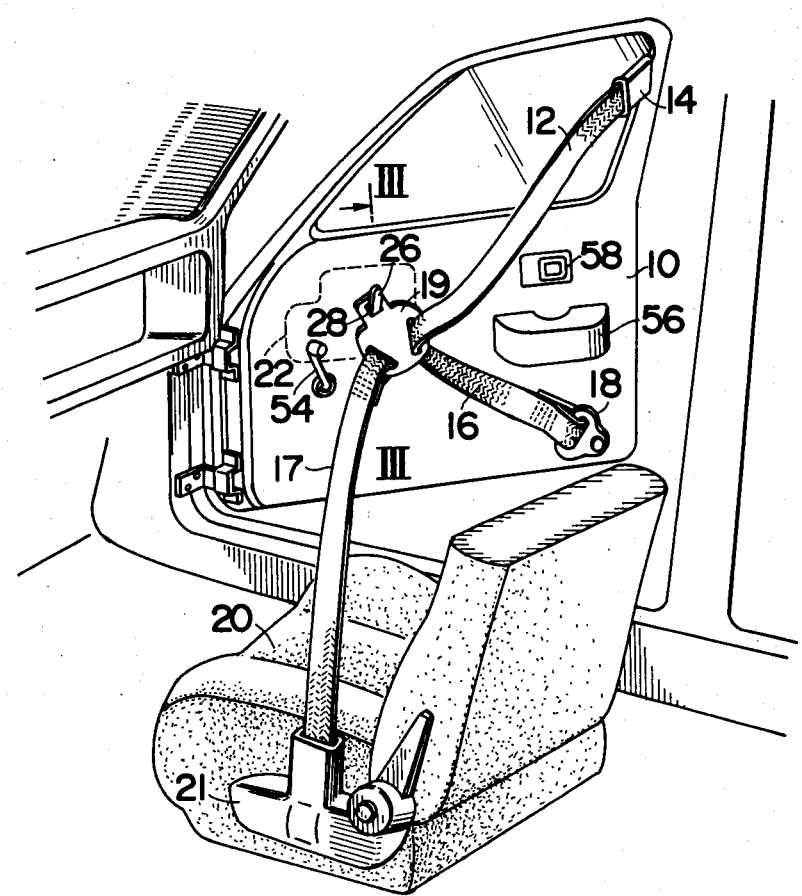
FIG. 1 is a front view showing the webbing hanging device according to the present invention.

In FIG. 1, engaged with the upper portion of a vehicle door 10 is one end of a shoulder webbing 12 through an anchor 14, and engaged with the lower portion of said door 10 is one end of a lap outer webbing 16 through an anchor 18, respectively. Furthermore, the other end of the shoulder webbing 12 is turned back at a connecting ring 19, and thereafter, connected to the other end of the lap outer webbing 16, said both webbings 12 and 16 being formed into one webbing. On the other hand, one end of a lap inner webbing 17 is turned back at the connecting ring 19 and sewn onto itself, and the other end of said lap inner webbing 17 is wound up by a retractor 21 provided on a side surface of an occupant's seat 20 opposite to the door 10.

Figure 2A:
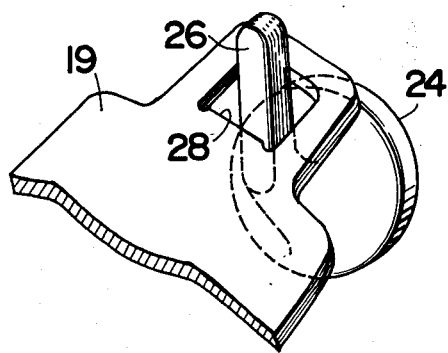
FIG. 2A is a perspective view showing the hanging position of the holder.
Figure 2B:
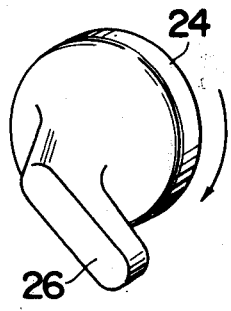
FIG. 2B is a perspective view showing the webbing dropping position of the holder.

Hereupon, a holder 24 having projected therefrom a hanging hook 26 is projected into the cabin through the surface of the door 10 from the webbing hanging device 22 provided in said door 10. As shown in FIG. 2A, the hanging position of the hanging hook 26 is an upwardly directed condition, on which an opening 28 of the connecting ring 19 can be hung. As shown in FIG. 2B, the dropping position of said holder 24 is a position to which the holder 24 is rotated through about 100° in the clockwise direction and where the connecting ring 19 can be dropped, said rotation being controlled by the webbing hanging device 22.

Figure 3:
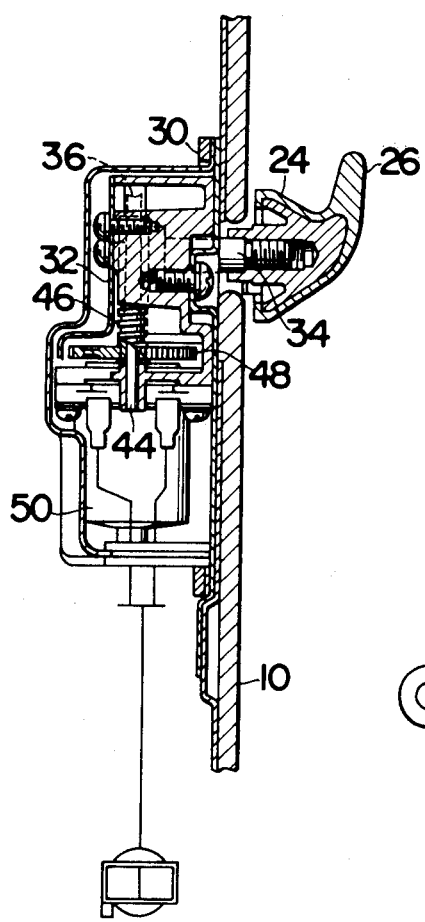
FIG. 3 is a cross-sectional view taken along the line III—III in FIG. 1.
Figure 4:
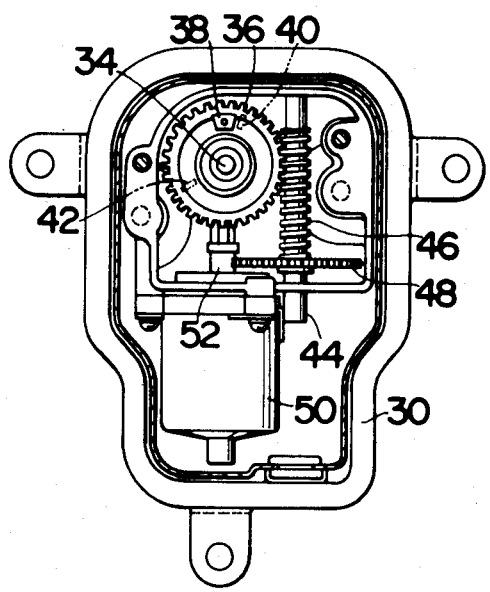
FIG. 4 is a left hand side view of FIG. 3.
Figure 5:
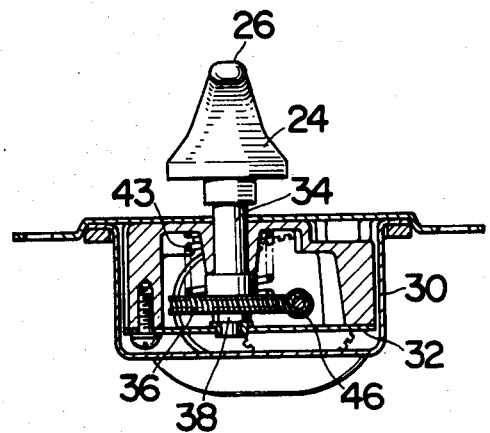
FIG. 5 is a plan view of FIG. 4.
Figure 6:
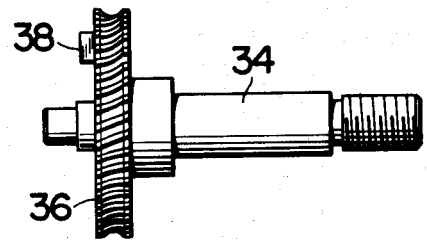
FIG. 6 is a side view showing the shaft.

As detailedly shown in FIGS. 3 through 5, the shaft 34 of said webbing hanging device 22 is pivotally supported by a base 30 and an auxiliary plate 32, both of which are secured to the inside of the door 10. As shown in FIG. 6, said shaft 34 is coaxially provided at the intermediate portion thereof with a worm wheel 36, and one end of said shaft 34 is projected into the cabin through the door 10. The holder 24 adapted to be rotated together with the shaft 34 is solidly secured to said end of the shaft 34 projected into the cabin.

Figure 7:
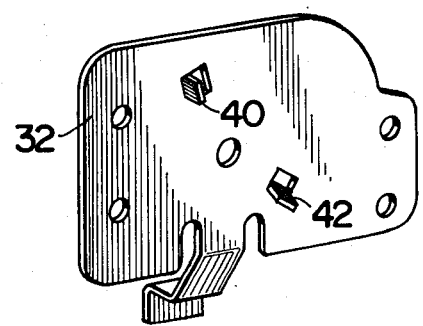
FIG. 7 is a perspective view showing the auxiliary plate.

Furthermore, as shown in FIG. 6, a projection 38 adapted to rotate together with the shaft is solidly secured to the shaft 34. Additionally, as shown in FIG. 7, a pair of shaved-up projections 40, 42 are provided on the auxiliary plate 32 in opposed relation with said projection 38. Hereupon, when the shaft 34 reaches the webbing hanging position, said projection 38 of the shaft 34 is adapted to come into abutting contact with the shaved-up projection 40, and, when the shaft 34 reaches the dropping position, said projection 38 of the shaft 34 is adapted to come into abutting contact with the shaved-up projection 42. Consequently, the shaft 34 together with the holder 24 are adapted to be rotated within the range from a position at which said projection 38 of the shaft 34 abuts against the shaved-up projection 40 to a position at which said projection 38 abuts against the shaved-up projection 42, with the rotating angle being about 105°

Hereupon, the worm wheel 36 is biased by a torsional coil spring 43 stretched between the base plate 30 and the worm wheel 36 so as to move in the direction of the hanging position, i.e. come into abutting contact with the shaved-up projection 40 and stop thereat.

A worm shaft 44 is pivotally supported by said base plate 32 in the direction perpendicular to the shaft 34, and a worm 46 of said worm shaft 44 is in mesh with the worm wheel 36. Additionally, solidly secured to said worm shaft 44 is a spur gear 48 being in mesh with an output gear 52 of a motor 50. Consequently, said worm shaft 44 is adapted to decelerate an output of the motor 50 to be transmitted to the shaft 34.

Hereupon, a frictional centrifugal clutch known in the art is incorporated in the motor 50 and adapted to transmit the driving force to the output gear of the motor only when the motor 50 is rotated. When the motor is not driven, said centrifugal clutch can be disconnected to allow the output shaft to rotate freely.

Furthermore, said motor 50, when the occupant is seated in the vehicle, e.g. the occupant closes the door upon entering the vehicle, can be rotated for a predetermined period of time to turn the shaft 34 in the direction of dropping the webbing, and, after the projection 38 of the shaft 34 comes into abutting contact with the shaved-up projection 42, this abutting contact is held for a short period of time by frictional contact means provided.

Furthermore, in FIG. 1, reference numeral 54 is a regulator handle, 56 an arm rest, and 58 an inside handle for opening or closing the door.

Description will hereunder be given of operation of the present embodiment with the arrangement as described above. When the occupant is seated in the vehicle, the connecting ring 19 is disengaged from the hook 24, whereby the shoulder webbing 12 and the lap webbing 16 are surroundingly attached to the occupant due to the wind-up force of the retractor 21, so that the three-point type webbings can be fastened to the occupant. More specifically, the lap webbing 16 is surroundingly attached to the waist of the occupant and the shoulder webbing 12 obliquely to the shoulder of the occupant, respectively, thus enabling to fasten the webbings to the occupant.

When the occupant opens the door and leaves the vehicle, the opening 28 of the connecting ring 19 can be hung on the hanging hook 26 of the holder 24. As shown in FIGS. 1 and 2A, said hanging hook 26 is disposed at the upwardly directed hanging position by the biasing force of the torsional coil spring 43, whereby the occupant can readily hang the connecting ring 19. Hereupon, acting on the connecting ring 19 is a mere very weak wind-up force of the retractor 21, which is not strong enough to rotate the hanging hook 26 against the biasing force of the torsional coil spring 43, whereby the condition of hanging the webbings is maintained, so that a space for the occupant to leave the vehicle can be formed between the seat 20 and the webbings, thereby enabling the occupant to readily leave the vehicle.

Thereafter, in the case the occupant enters the vehicle again, a sufficient space for the occupant to enter the vehicle is formed between the seat 20 and the webbings, so that the occupant can readily be seated at the seat 20.

When the occupant closes the door after he is seated, the motor 50 is rotated due to a signal for closing the door. The driving force of the motor 50 is transmitted by the centrifugal clutch incorporated in the motor 50 to the holder 24 through the worm shaft 44 and the shaft 34, whereby the holder 24 is rotated to the dropping position against the biasing force of the torsional coil spring 43 as shown in FIG. 2B, thus releasing the hanging of the connecting ring 19. Rotation of the motor 50 causes the hanging hook 26 to rotate as far as the projection 38 abuts against the shaved-up projection 42, and, after the projection 38 abuts against the shaved-up projection 42, the frictional centrifugal clutch (not shown) in the motor 50 makes sliding, so that the hanging hook 26 can be maintained at the dropping position.

Consequently, the webbings 12, 16 and 17 can be automatically fastened to the seated occupant by the wind-up biasing force of the retractor 21.

Thereafter, a voltage supply to the motor 50 is interrupted by a timer or the like in a predetermined period of time, which brings the motor 50 to a stop. The stop of the motor disconnects a output shaft of the motor from the shaft 34, whereby the shaft 34 is restored to the hanging position by the biasing force of the torsional coil spring 43.

In addition, in the case the vehicle is fallen into an emergency during running of the vehicle, an inertia lock sensor in the retractor 21 is actuated to prevent the webbings from being wound off, so that the occupant can be reliably restrained, thereby securing the safety of the occupant.

Furthermore, in the case the occupant leaves the vehicle, if he hangs the connecting ring 19 on the hook 26 when the door is opened, then he can easily leave the vehicle.

Additionally, in the case the occupant closes the door 10 while holding the webbing 12, 16 or 17 when he enters the vehicle, the holding force is imparted to the connecting ring 19, whereby the hook 26 is rotated to the dropping position as shown in FIG. 2B against the biasing force of the torsional coil spring 43 so as to drop the connecting ring 19, so that there is no possibility of that the hook 26 and the webbing hanging device are broken.

As has been described so far, such excellent advantages can be offered by the webbing hanging device according to the present invention that the holder is biased by the resilient member in the direction of the hanging position and the driving force of the driving source is imparted to the holder where deemed necessary, so that the hanging of the webbings can be very reliably released. And the hook can be reliably restored after the hanging of the webbings is released, so that the wind-up biasing force for the webbings can be weakened to a considerable extent. Moreover, in the case the occupant closes the door while holding the webbing when he enters the vehicle, the parts can be prevented from being broken.

What is claimed is:

1. A webbing hanging device on which webbing for restraining an occupant is hung in a seatbelt system for a vehicle, comprising:
   (a) a holder having projected therefrom a hanging hook and rotatable within the range from a webbing hanging position for webbing for restraining an occupant to a webbing dropping position for releasing the hanging of said webbing;
   (b) a resilient member for biasing said holder in the direction of said hanging position; and
   (c) a driving source coupled to said holder for rotating the holder in the direction of said dropping position and fastening the webbing to the occupant, the driving source being transmitted to said holder whereby after the occupant has entered the vehicle, a driving force of said driving source causes the holder to turn to a dropping position, said webbing is released from said holder to restrain the occupant and said holder is biased by said resilient member to be set at a hanging position.

2. A webbing hanging device as set forth in claim 1, wherein each one end of said webbings are secured to the vehicle door, whereby the webbings are fastened to the occupant in accordance with the opening or closing of the door.

3. A webbing hanging device as set forth in claim 2, wherein said driving source is provided in the vehicle door and said hanging hook is projected into the cabin.

4. A webbing hanging device as set forth in claim 3, wherein said driving source is a motor provided in the door for transmitting a driving force to said hook through a centrifugal clutch.

5. A webbing hanging device as set forth in claim 3, wherein said driving source is a motor provided in the door for transmitting a driving force to said hook for a predetermined period of time due to a door closing signal.

6. A webbing hanging device as set forth in claim 1, wherein said holder is limited in rotating angle by a pair of stoppers provided in the door.

7. A webbing hanging device as set forth in claim 6, wherein said pair of stoppers are shaved-up projections provided on a plate supporting the shaft of the holder.

8. A webbing hanging device as set forth in claim 7, wherein said resilient member is a torsional coil spring.

9. A webbing hanging device as set forth in claim 1, wherein said webbing comprises a shoulder webbing and a lap webbing and a connecting ring provided between said two webbings which is adapted to be hung onto said hanging hook.

10. A webbing hanging device as set forth in claim 1, wherein said hanging hook is turned in accordance with the closing action of the door from an upright position to a rearwardly horizontal position parallel with an inner side surface of the door.

* * * * *